No. 666,343. Patented Jan. 22, 1901.
E. DUPLESSIS.
MACHINE FOR SHAPING BOTTOMS OF SHOES.
(Application filed Sept. 14, 1899.)
(No Model.) 9 Sheets—Sheet 1.

Witnesses: Elouild Duplessis Inventor
William B. Roberts By Marion & Marion
Attorneys No. 666,343. Patented Jan. 22, 1901.
E. DUPLESSIS.
MACHINE FOR SHAPING BOTTOMS OF SHOES.
(Application filed Sept. 14, 1899.)
(No Model.) 9 Sheets—Sheet 9.

Witnesses:
Wm. J. Koerth.
William B. Roberts

Elouild Duplessis Inventor
By Marion & Marion
Attorneys

THE NORRIS PETERS CO., PHOTO-LITHO., WASHINGTON, D. C.

UNITED STATES PATENT OFFICE.

ELOUILD DUPLESSIS, OF ST. HYACINTHE, CANADA, ASSIGNOR TO THE DUPLESSIS PEGGING AND SEWING MACHINE COMPANY, OF SAME PLACE.

MACHINE FOR SHAPING BOTTOMS OF SHOES.

SPECIFICATION forming part of Letters Patent No. 666,343, dated January 22, 1901.

Application filed September 14, 1899. Serial No. 730,414. (No model.)

*To all whom it may concern:*

Be it known that I, ELOUILD DUPLESSIS, a subject of Her Majesty the Queen of Great Britain, residing at St. Hyacinthe, county of St. Hyacinthe, Province of Quebec, Canada, have invented certain new and useful Improvements in Machines for Shaping the Bottoms of Shoes; and I do hereby declare that the following is a full, clear, and exact description of the invention, such as will enable others skilled in the art to which it appertains to make and use the same.

My invention relates to improvements in sole leveling and shaping machines for the bottoms of shoes; and the chief object in view is the production of a machine which will be entirely automatic in its operation after the work shall have been placed on the jack and the machine started.

A further object is to equip the machine with means whereby the entire sole or shoe-bottom may be uniformly shaped and the pressure regulated so as to supply the exact amount of pressure required by bottoms of varying thicknesses without further attention of the operator.

A further object is to equip the machine with an improved flexible sole-shaping roll which shall be self-adjusting or automatic in accommodating and adapting itself to the contour of the sole and the shank thereof, and with this self-adjusting flexible roller are combined a pressure mechanism and a manually-operable controlling device. Said pressure mechanism acts on the individual members of the self-adjusting shaping-roll, so as to give the necessary pressure thereto, particularly when the members break, so as to assume divergent relation in conforming to the contour of the sole and the shank thereof, and, furthermore, this pressure mechanism for the flexible shaping-roll has a shiftable element that may be easily adjusted by hand, so as to vary the pressure exerted by said mechanism on the members of the flexible shaping-roll, whereby said shaping-roll may be adapted to exert the requisite pressure on soles of varying thicknesses. The manually-operable shifting device for the flexible shaping-roll provides an emergency controller which may be availed of to actuate said roll in a manner to assume divergent relation without stopping the machine—that is to say, the roll may be controlled while it is pursuing its traversing path over the jack, whereby said roll may be adapted to peculiar-shaped shoe-bottoms.

A further object of the invention is to provide means for automatically reversing the movement of the swinging carrier-frame on which the jack is mounted, said means including a reversible friction drive-gear and a variable stop-motion, which permits the swinging or arcuate motion of said frame to be varied according to the sizes of shoes which it may be desired to apply to the last.

A further object is to provide an improved means for supporting a jack in operative relation to said flexible shaping-roll and permitting said jack to move in a path approximately at right angles to the traversing movement of the shaping-roll.

A further object is to provide an improved means for holding a toe-last in adjustable relation to a part of the swinging jack.

A further object is to provide an adjustable last-support which is adapted to be easily and quickly removed from the jack.

To these ends the invention consists in a machine for shaping the bottoms of shoes, constructed substantially as hereinafter illustrated and described, and defined in the appended claims.

Referring to the drawings, in which similar letters of reference indicate similar parts throughout the several views, Fig. 3 is a similar view showing the other side of the machine.

In machines for shaping the bottoms of shoes as ordinarily constructed it is necessary for the operator to swing the jack-frame by hand as the bottom is fed to the shaping-roller in order to properly shape the edges of the bottom because of the use of a rigid shaping-roller. This operation not only necessitates tiresome labor, but is defective, in that as one edge of the bottom is pressed by the shaping-roller the other edge has a tendency to bulge up, rendering it necessary to pass the bottom repeatedly beneath the shaping-roller and resulting in defective bottoms, it being almost impossible to shape both edges of the bottom uniformly. To obviate these defects and lessen the labor attending the shaping of bottoms, the machine herein described has been devised, whereby the entire bottom is uniformly shaped and the pressure regulated so as to provide the exact amount of pressure required by bottoms of varying thickness without requiring the personal efforts or attention of the operator.

Figure 4:
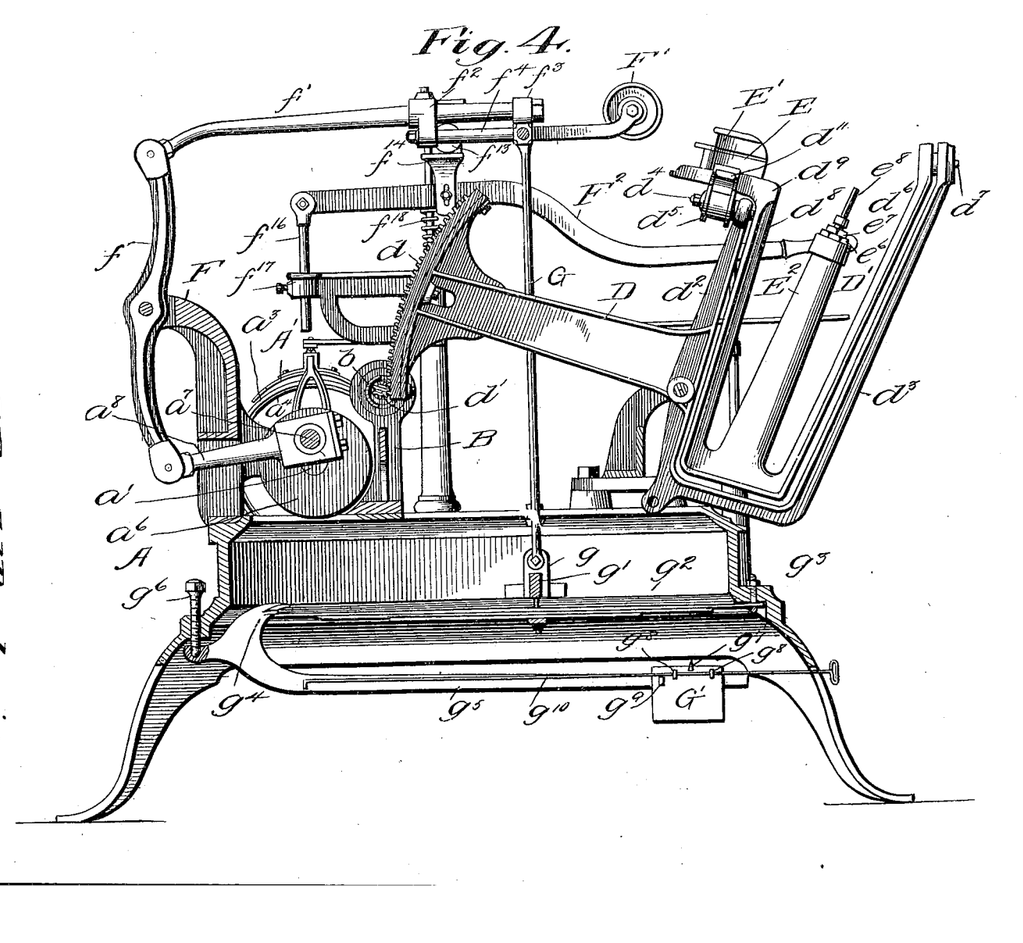
Fig. 4 is a view in elevation, partly in section, to show details of construction.

In the drawings, A represents a suitable frame, which may be of any usual or preferred form. Suitable bearings $a$ are fixed upon said frame, in which is journaled the operating-shaft $a'$, having a balance-wheel $a^2$ at one end and suitable pulleys $a^3$ and $a^4$ at the other end, one of which is loose, which are connected by a suitable belt to the source of power. (Not shown.) A belt-shifting device $A'$, which may be of any usual or preferred form, is provided for applying and shutting off the power. At an intermediate point upon the shaft $a'$ are fixed two disks $a^6$, which are suitably spaced, between which is eccentrically fixed a crank-shaft $a^7$, upon which is sleeved the crank-rod $a^8$, as best shown in Fig. 4. Upon the shaft $a'$, adjacent to the balance-wheel $a^2$, is fixed a friction-disk $a^9$, having at its outer face a gear-wheel $a^{10}$, which meshes with a gear-wheel $a^{11}$, fixed upon the outer face of the friction-disk $a^{12}$, which is fixed upon a shaft $a^{13}$, journaled in suitable bearings mounted upon the frame A.

Figure 5:
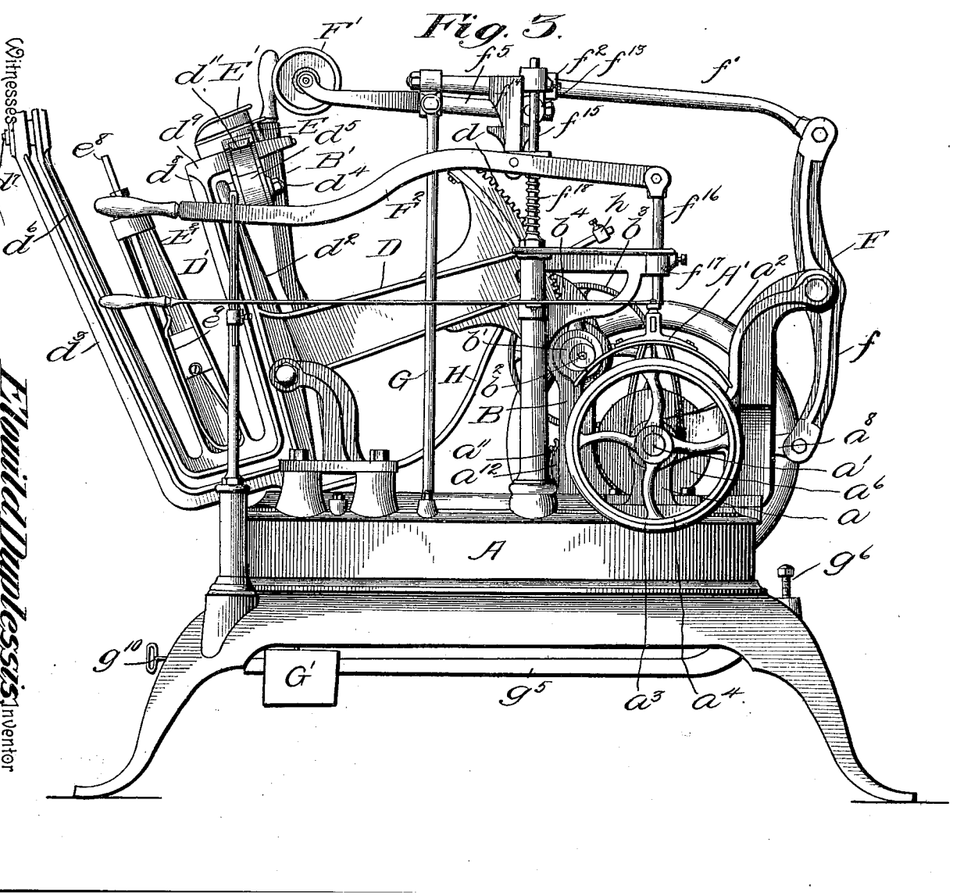
Fig. 5 is a similar view, drawn on an enlarged scale, showing the lower portion of the machine.
Figure 6:
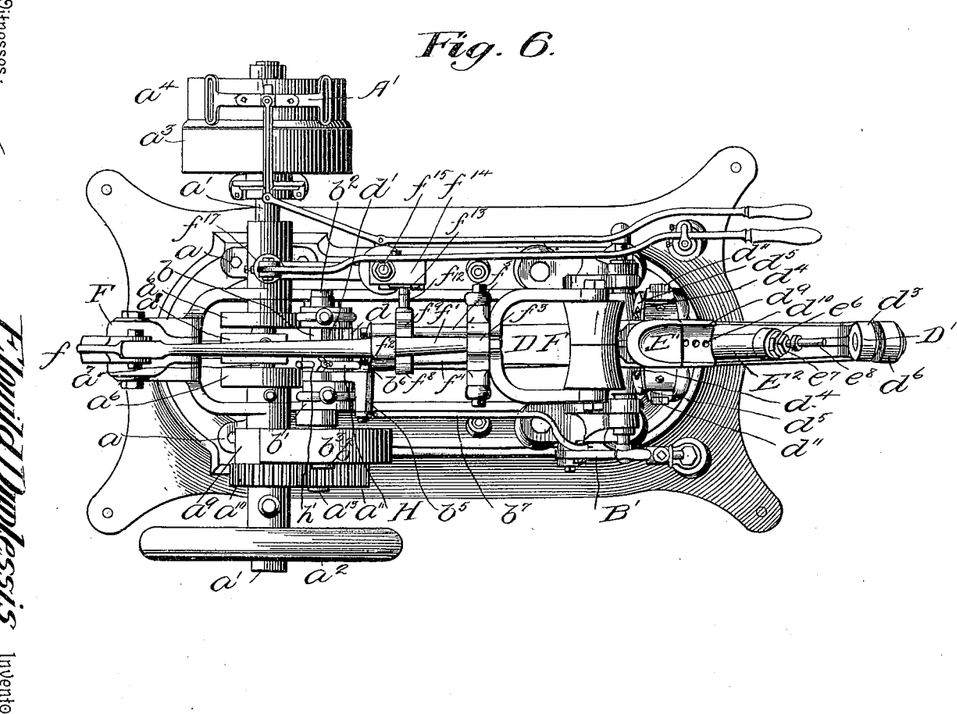
Fig. 6 is a top or plan view.

A standard B is mounted upon the frame A adjacent to the shaft $a'$ and is provided with suitable bearings, in which is journaled a hollow shaft or sleeve $b$, having the eccentric cam $b'$. Within the hollow shaft $b$ is a shaft $b^2$, arranged eccentrically with respect to said cam $b'$, and fixed upon the outer end of said shaft $b^2$ is the friction-wheel $b^3$, which is adapted to be thrown into and out of engagement with the friction-disks $a^9$ and $a^{12}$, as best shown in Fig. 5.

Fixed to the hollow shaft $b$ is an upwardly-projecting lug $b^4$, which is provided upon its upper end with the lateral extensions $b^5$ and $b^6$, which project in opposite directions upon each side of the said lug $b^4$. Pivotally connected with the extension $b^5$ is an operating-rod $b^7$, which is adjustably connected at its other end to an operating-lever B' by means of a pin adapted to engage one of a series of perforations formed in said lever B'.

From the above description it will be apparent that by moving the lever B' the friction-wheel $b^3$ may be thrown into or out of engagement with the friction-disk $a^9$ or $a^{12}$ or retained in an inoperative position between the two disks $a^9$ and $a^{12}$ and out of engagement with either. It is also obvious that the friction-wheel $b^3$ can be rotated in either direction, in accordance with the friction-disk with which it is thrown into engagement.

Figure 1:
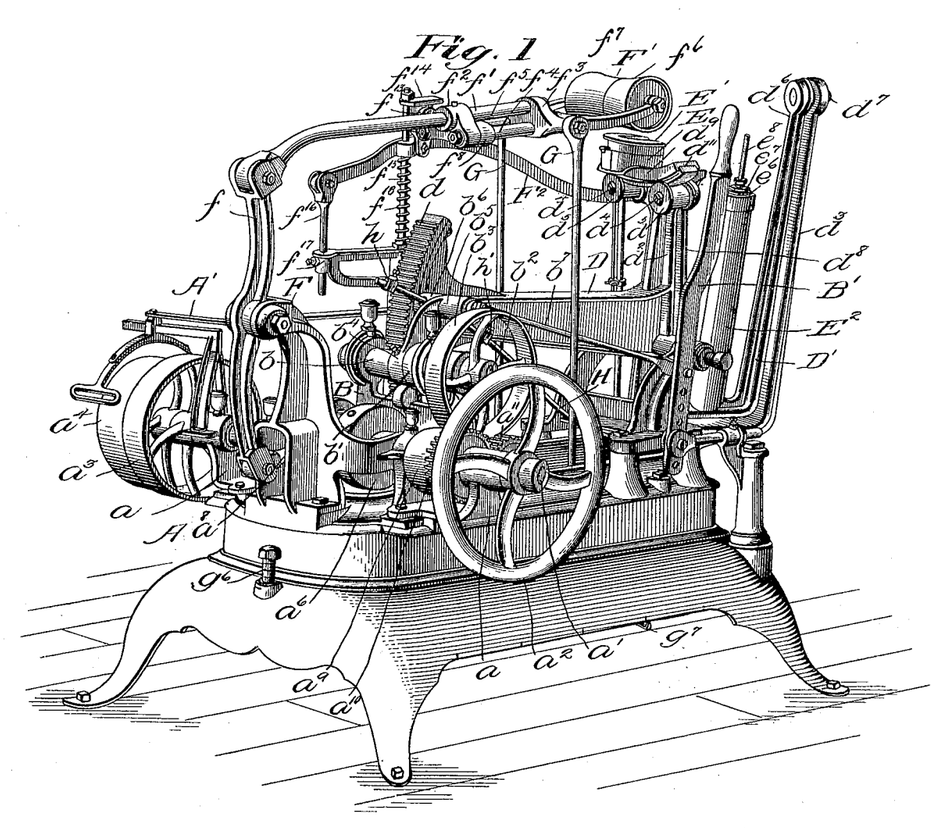
Figure 1 is a view in perspective of a machine for shaping the bottoms of shoes, constructed in accordance with this invention.
Figure 2:
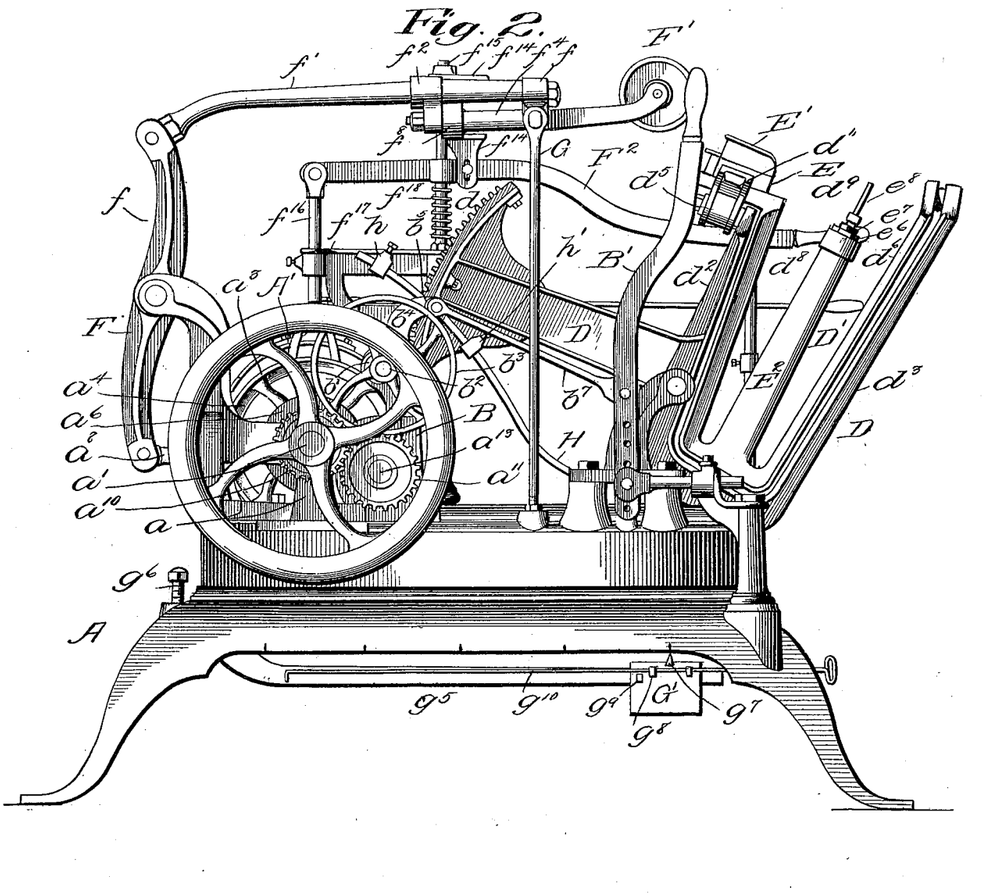
Fig. 2 is a view in elevation thereof.

Pivotally supported in suitable brackets mounted upon the frame A is the oscillating frame D, which is provided at one end with a toothed segment $d$, which is adapted to mesh with a pinion $d'$, fixed upon the shaft $b^2$, as best shown in Fig. 4. The other end of the oscillating frame D is formed into a yoke having upwardly-extending arms $d^2$ and $d^3$, within which is pivotally supported the jack-frame D', so as to permit said jack-frame to swing freely in said oscillating frame. The upper end of the arm $d^2$ is provided with two outwardly-extending pins $d^4$, upon which are rotatably mounted the friction-rollers $d^5$. (Clearly shown in Fig. 1.)

The jack-frame D' (shown in detail in Fig. 9) is also yoke-shaped and conforms substantially in shape with the yoke of the oscillating frame D. One of the arms $d^6$ of the jack-frame D' is provided with a pivot-pin $d^7$, which is adapted to engage an eye formed in the upper end of the oscillating frame D, while the other arm $d^8$ is provided with a lateral extension $d^9$, in which is formed a series of openings or sockets $d^{10}$. Upon the under surface of the extension $d^9$ is secured a plate $d^{11}$, which is adapted to rest and slide upon the friction-rollers $d^5$. (Clearly shown in Fig. 1.) A block E, having a threaded opening $e$, is adjustably mounted upon the upper face of the extension $d^9$, the contacting surfaces of the block and extension being suitably curved in order to maintain the proper adjustment.

A toe-cap E' is secured to the block E by means of a threaded shank $e'$ engaging the opening $e$, so as to permit of the vertical adjustment of said cap. The upper surface of the toe-cap E is suitably curved or hollowed, so as to adapt it to receive and retain the toe portion of the last. The under surface of the toe-cap E is provided with a notch $e^2$, which is adapted to receive the end of a spring-pressed pin $e^3$, mounted in the block E, by means of which the toe-cap is prevented from accidentally turning. A recess $e^4$ is formed in the upper surface of the block E to receive the end of the pin $e^3$ when the same is pressed down to permit of the adjustment of the toe-cap. The extremity of the shank $e'$ is provided with a pin $e^5$, which is adapted to engage one of the sockets $d^{10}$, by means of which the block E is held in its adjusted position.

A hollow arm $E^2$ is formed integral with the jack-frame D' and extends upwardly between the arms $d^6$ and $d^8$. The upper end of the arm $E^2$ is provided with a threaded collar $e^6$, and within said collar is loosely sleeved the adjusting-nut $e^7$, which is of slightly smaller diameter than the opening of said collar $e^6$ and is provided with a flange upon its upper end. A last-supporting rod $e^8$ is threaded in the nut $e^7$, so as to be adjusted vertically, and its lower end is engaged by a suitable spring $e^9$, the end of which is secured to the arm $E^2$, by means of which the rod $e^8$ is held back to the limit of its movement in one direction in the collar $e^6$. By means of this construction the last, which is secured in the usual manner upon the end of the rod $e^8$, is adapted to move slightly under the pressure of the shaping-roller.

It is apparent from the construction above described that the rotation of the shaft $b^2$ will cause an upward or downward movement to the oscillating frame D corresponding with the direction of rotation of the friction-wheel $b^3$, and this movement will force or feed the last carrying the bottom being operated upon back and forth under the shaping-roller.

To a lug formed upon the lower portion of the oscillating frame D is pivoted a rod H, the outer end of which plays freely in an opening formed in the lateral extension $b^6$ of the lug $b^4$. At suitable points on the rod H are adjustably fixed the stops $h$ and $h'$, located, respectively, on either side of the said extension $b^6$, as shown in Fig. 5. During the movement of the oscillating frame D the rod H moves freely through the extension $b^6$ until one or the other of the stops $h$ or $h'$ comes into contact therewith, whereupon the hollow shaft $b$ will be rotated and the friction-wheel $b^3$ thrown out of contact with its operating-disk and into contact with the other, whereby the movement of the oscillating frame is reversed. This construction also prevents the toothed segment $d$ from running off the pinion $d'$. By suitably adjusting said stops $h$ and $h'$ upon the rod H the oscillating movement of the frame D may be limited to suit the requirements of the work being done.

Figures 12, 13, 14:
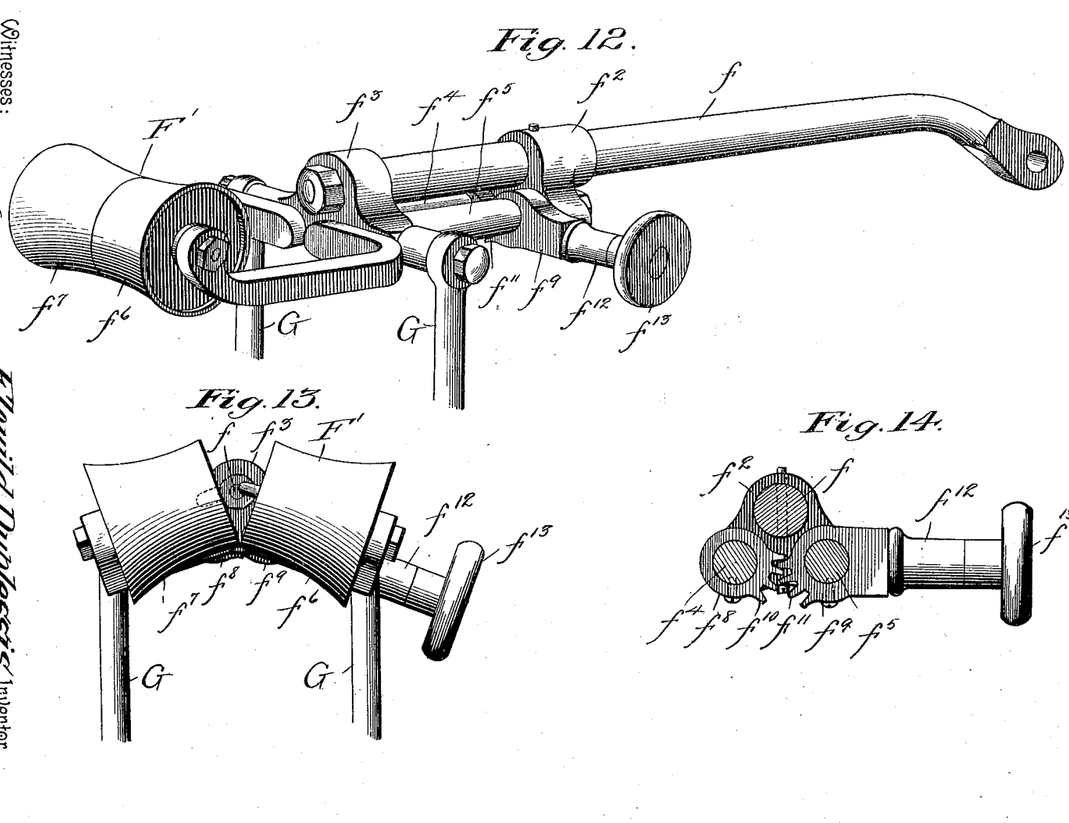
Fig. 12 is a view in perspective of the flexible shaping-roller and a portion of its adjusting mechanism detached from the machine.
Fig. 13 is an end view thereof, showing the flexible roller adjusted so as to shape the edges of the bottom.
Fig. 14 is a detail view of a portion of the adjusting mechanism of the flexible shaping-roller.

Upon the rear of the frame A is the standard F, in which is pivoted the link $f$, the lower end of which is pivotally connected with the crank-rod $a^8$. The upper end of the link $f$ is pivotally connected with the rod $f'$, which extends forwardly over the top of the oscillating frame D. Upon the rod $f$ are fixed the brackets $f^2$ and $f^3$, within which are journaled the shafts $f^4$ and $f^5$, in the forward extremities of which are journaled the two sections $f^6$ and $f^7$ of the flexible shaping-roller F'. The general conformation of this shaping-roller F' corresponds to those in common use, being of the smallest diameter at the center and curving from thence to the outer ends. The shifting roller forming an important feature of this invention is, however, made in two similar sections $f^6$ and $f^7$, each of which is rotatably supported in the ends of the shafts $f^4$ and $f^5$, as clearly shown in Figs. 12 and 13. One of the sections is provided with a socket and the other with a pin at their meeting faces, whereby they are supported under pressure and retained in proper position with respect to each other.

At a suitable point upon each of the shafts $f^4$ and $f^5$ is fixed a sleeve $f^8$ and $f^9$, having toothed segments $f^{10}$ and $f^{11}$ upon their adjacent faces, whereby the movement of one shaft will cause a corresponding movement of the other shaft. One of these sleeves, preferably $f^5$, is provided with an outwardly-extending lug $f^{12}$, having upon its extremity a friction-roller $f^{13}$. (Clearly shown in Figs. 12, 13, and 14.) This friction-roller $f^{13}$ engages a guideway formed by a bracket $f^{14}$, slidably mounted upon the upper end of a supporting-rod $f^{15}$. Pivotally connected with the bracket $f^{14}$ is an operating-lever $F^2$, the rear end of which is pivoted to a rod $f^{16}$, adjustably secured in an arm $f^{17}$, fixed to the rod $f^{15}$. (See Fig. 1.) A suitable spring $f^{18}$ is coiled about the rod $f^{15}$ and serves to return the lever to its normal position after having been depressed by the operator.

By reason of the connection of the crank-rod $a^8$ with the disk $a^6$ it will be apparent that the rotation of said disk will impart a horizontally-reciprocating movement to the shaping-roller F', while depressing the lever $F^2$ will force the shaping-roller to assume the desired curvature to simultaneously shape both edges of the bottom.

Figure 7:
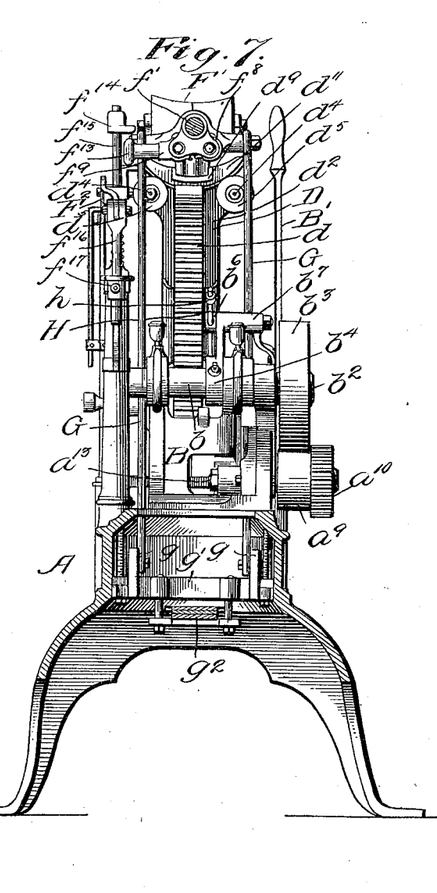
Fig. 7 is an end elevation viewed from the rear of the machine.
Figure 8:
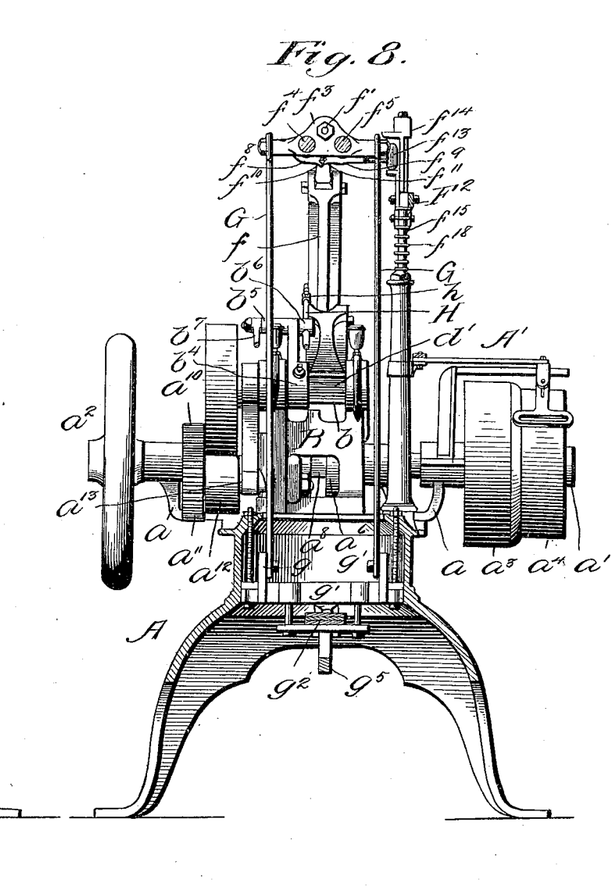
Fig. 8 is a similar view looking from the front of the machine.

To the bracket $f^3$ are pivotally connected the rods G, which are pivotally connected at their lower ends to lugs $g$, fixed upon a cross-bar $g'$. (See Figs. 4, 7, and 8.) Upon the cross-bar $g'$ is supported a strong spring $g^2$, which is secured at one end to a suitable tie-bolt $g^3$, while the other end of this spring is supported in a notch formed in the curved projection $g^4$ of the lever-bar $g^5$, which is pivotally supported by means of a tie-bolt $g^6$ in the lower part of the frame A. (See Fig. 4.) The lever-bar $g^5$ extends beneath the frame A and along the entire length thereof, and slidably secured upon said lever-bar is the weight G', which is provided with an indicator-arm $g^7$. A suitable scale is formed upon the side of the frame A, whereby the amount of pressure upon said lever-bar, and consequently upon the shaping-roller F', can be accurately determined. The weight G' is provided with perforated lugs $g^8$ and a suitable stop $g^9$, and a handle-rod $g^{10}$ is slidably sleeved in the perforations of said lugs $g^8$.

Figures 9, 10, 11:
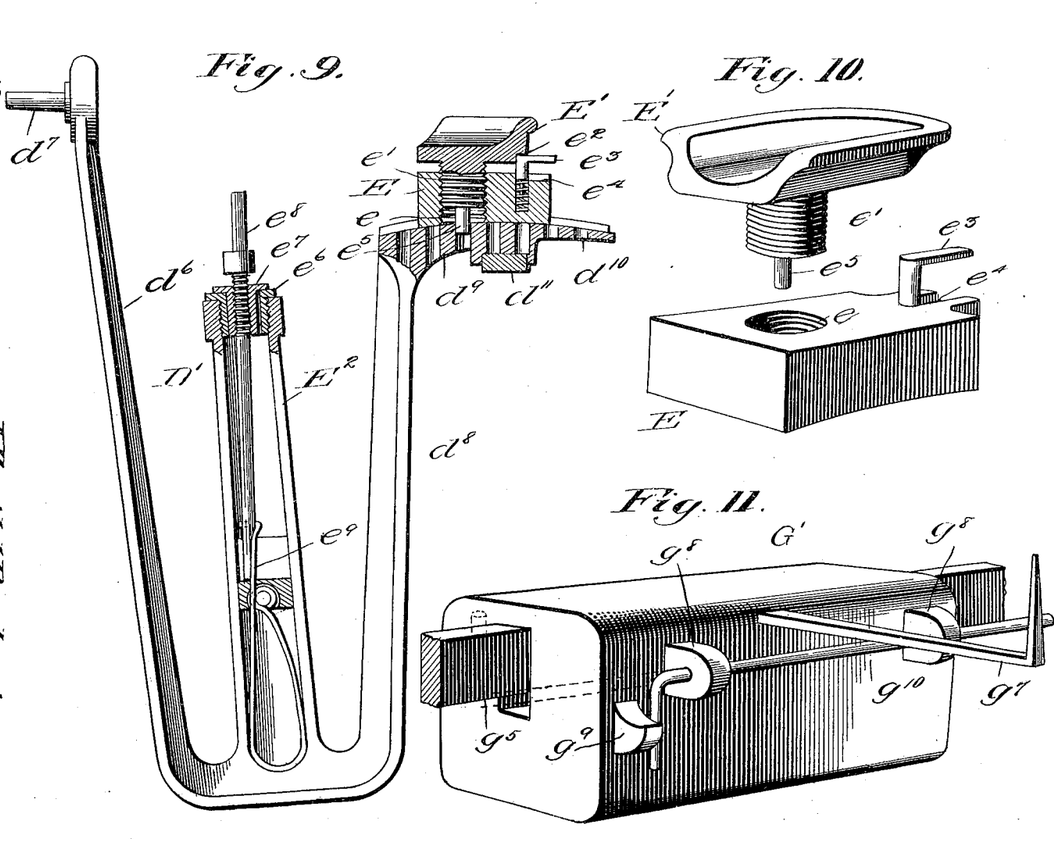
Fig. 9 is a view in elevation of the jack-frame, partly in section.
Fig. 10 is a view in perspective of the adjustable last-support, the parts being separated to show the construction.
Fig. 11 is a view in perspective of the adjustable weight, showing the mechanism for adjusting the weight upon its supporting-rod.

One end of the rod $g^{10}$ is provided with a suitable handle, while the other end is bent at an angle, whereby it may be turned into and out of contact with the stop $g^9$, as is clearly shown in Fig. 11. By means of this construction the rod $g^{10}$ can be made of sufficient length to permit of the convenient adjustment of the weight to any point upon the lever-bar $g^5$ without projecting an objectionable distance beyond the frame A.

It is believed that the operation of the machine will be fully understood in view of the above description without further detailed explanation.

While I have herein shown a preferred form of carrying my invention into effect, yet I do not desire to limit myself to such preferred details of construction, but claim the right to use any and all modifications thereof which will serve to carry into effect the objects to be attained by this invention in so far as such modifications and changes may fall within the spirit and scope of my said invention.

I claim—

1. In a sole-leveling machine, a traveling sole-shaping roll comprising complemental members having their roll-shafts intergeared one with the other to adapt said members to simultaneously assume corresponding positions in alinement with, or at an angle to, one another, combined with a jack adapted to be traversed by the shaping-roll, and pressure mechanism for said shaping-roll to make its members conform automatically to the contour of a sole on said jack, as and for the purposes set forth.

2. In a sole-leveling machine, a sole-shaping roll consisting of complemental members and having the roll-shafts intergeared one with the other for giving to said roll members simultaneous and uniform movement in assuming angular positions relative one to the other or in moving to alined relation, as and for the purposes described.

3. In a machine for shaping the bottoms of shoes, the combination with a flexible shaping-roller of an oscillating frame; and a jack-frame pivotally mounted therein and adapted to automatically swing by the movement of said flexible shaping-roller, substantially as described.

4. In a machine for shaping the bottoms of shoes, the combination of a flexible shaping-roller; means for varying the shape of said shaping-roller; an oscillating frame; means for imparting an oscillating movement to said oscillating frame; and a jack-frame pivotally mounted in said oscillating frame and adapted to be swung automatically by the movement of said flexible roller, substantially as described.

5. In a machine for shaping the bottoms of shoes, the combination of a flexible shaping-roller; means for varying the shape of said shaping-roller; an oscillating frame; means for imparting an oscillating movement to said frame; means for limiting the movement of said oscillating frame in either direction; and a jack-frame pivotally mounted in said oscillating frame and adapted to be swung automatically by the movement of said shaping-roller, substantially as described.

6. In a machine for shaping the bottoms of shoes, the combination of an oscillating frame; a jack-frame pivotally mounted therein, a rod pivotally supported above said oscillating frame; means for imparting a horizontally-reciprocating movement to said rod; parallel shafts journaled in bearings fixed upon said rod; intermeshing toothed segments fixed upon said shafts; means connected with one of said segments for rotating said shafts; and a divided shaping-roller rotatably mounted between said shafts, substantially as described.

7. In a machine for shaping the bottoms of shoes, the combination of an oscillating frame; a jack-frame pivotally mounted therein; a rod pivotally supported above said oscillating frame; means for imparting a horizontally-reciprocating movement to said rod; a flexible shaping-roller rotatably supported upon said rod; means for varying the shape of said shaping-roller, a second rod pivotally connected with the first-mentioned rod, a spring connected to the lower end of said second-mentioned rod, a lever-bar connected with one end of said spring, and a weight adjustably mounted upon said lever-bar, substantially as described.

8. In a machine for shaping the bottoms of shoes, the combination of an oscillating frame; having vertically-extending arms integral therewith, friction-rollers mounted upon the extremity of one of said arms and an eye formed in the extremity of the other of said arms; a jack-frame having vertically-extending arms, a perforated extension fixed upon one of said arms and adapted to rest and slide upon said friction-rollers, and a pivot-pin integral with the other of said arms and adapted to engage the eye of said oscillating frame; a last-support carried by said jack-frame; a flexible shaping-roller mounted above said jack-frame, means for varying the shape of said shaping-roller, means for imparting a horizontally-reciprocating movement to said shaping-roller; means for oscillating said oscillating frame; and an adjustable weight connecting with said shaping-roller, substantially as described.

9. In a sole-leveling machine, a sole-shaping roll comprising complemental members arranged to break to angular positions or to assume alined relation, and intergeared supporting devices connecting said roll members to insure uniform and simultaneous movement thereto in assuming the alined or angular relation, combined with a jack, and a roll-pressure mechanism, substantially as described.

10. In a sole-leveling machine, a sole-shaping roll comprising complemental members, and intergeared supporting devices arranged to carry said members and to give uniform and simultaneous movement positively thereto in breaking to angular positions or assuming an alined relation, combined with a jack, and pressure mechanism acting individually on the separate roll members, substantially as described.

11. In a sole-leveling machine, a sole-shaping roll comprising rock-shafts having inwardly-extending spindles, roll members journaled in said spindles of the rock-shafts and capable of assuming alined or divergent relations one to the other, and means for giving positive and simultaneous movement to the rock-shafts and to the roll members, combined with a jack, and mechanism for causing the shaping-roll to traverse the jack, substantially as described.

12. In a sole-leveling machine, a self-adjusting sole-shaping roll consisting of a reciprocatory supporting device, parallel rock-shafts journaled in said supporting device and having cranked portions arranged to carry complemental roll members which are sustained in movable relation one to the other to assume divergent or alined relation, and means connected to said rock-shafts for giving positive movement to the latter and the roll members, in combination with a jack, and means for giving a traversing movement to the reciprocatory supports for the shaping-roll, substantially as described.

13. In a sole-leveling machine, the combination of a self-adjusting sole-shaping roll having movable complemental members mounted on roll-shafts which are intergeared to assume divergent and alined relation, a jack, means for imparting a traversing motion to said shaping-roll across said jack, and a pressure mechanism operatively connected with the individual members of the shaping-roll, whereby each roll member is adapted in either its alined or divergent position to act under pressure upon the work on the jack, substantially as described.

14. In a sole-leveling machine, the combination with a jack, of a sole-shaping roll capable of a traversing movement with respect to said jack, and a roll-pressure mechanism operatively connected to said roll to exert a constant given pressure thereon and said mechanism also including a shiftable element arranged to give increased pressure to the roll, substantially as described.

15. In a sole-leveling machine, the combination with a jack, and a sole-shaping roll having a traversing movement with respect to said jack, of a pressure mechanism including a lever, a shiftable weight on said lever, and a spring-pressure device operatively related to the lever and to a support for said sole-shaping roll, whereby the pressure mechanism exerts a constant tension on the shaping-roll, and by adjusting the weight said tension may be increased or diminished, as desired.

16. In a sole-leveling machine, the combination with a jack, of a two-part shaping-roll capable of a traversing movement with respect to the jack, and a variable-pressure mechanism including a spring element operatively connected to the member of said shaping-roll to give a constant pressure thereto, said pressure mechanism also having a shiftable element arranged to increase or diminish, beyond the limit of the constant pressure of the spring element, the pressure on the roll exerted by the pressure mechanism, as and for the purposes set forth.

17. In a sole-leveling machine, the combination with a two-part shaping-roll, and a jack, of a pressure mechanism including a spring-sustained bar which has individually-linked connections with the members of said shaping-roll, a lever connected with said bar, and a shiftable weight carried by said lever and adapted to increase or diminish the pressure exerted by said mechanism on the shaping-roll, as and for the purposes set forth.

18. In a sole-leveling machine, the combination with a shaping-roll, and a reciprocatory support therefor, of a pressure mechanism connected with said roll-support, a track adjacent to the roll-support, a traveler adapted to said track and carried by the roll-support to be shiftable therewith, and hand-operable means adapted to shift the relation of the track to the path of the roll-support, substantially as described.

19. In a sole-leveling machine, the combination with a jack, and a shaping-roll having a traversing movement relative to the jack, of a lever carrying a track, a reciprocatory support for the shaping-roll and having a traveler adapted to said track, a pressure mechanism connected with the roll-support, and means for sustaining the lever and the track normally in a stationary relation in opposition to the movement adapted to be given to the roll-support by the pressure mechanism, substantially as described.

20. In a sole-leveling machine, the combination with a swinging frame, means for vibrating said frame, and a sole-shaping roll, of a jack-frame having at one end a loose pivotal connection with said swinging frame, means for slidably supporting the other end of the jack-frame on said swinging frame and arranged for said slidably-mounted end of the jack-frame to have a limited play in a path at right angles to the plane of movement of the swinging frame, and a last-support carried by the jack-frame, substantially as described.

21. In a sole-leveling machine, the combination with a swinging frame, and a sole-shaping roll, of a jack-frame having at one end a pivotal connection with the swinging frame, means between the other end of the jack-frame and a portion of the swinging frame to shiftably maintain said jack-frame with relation to the swinging frame, a toe-last carried by the shiftable portion of the jack-frame, and a last-support on said jack-frame, substantially as described.

22. In a sole-leveling machine, the combination with a swinging frame, and a sole-shaping roll, of a jack-frame pivoted at its heel to the swinging frame and having an angular extension at its opposite end, means for shiftably sustaining a portion of said extension on the swinging frame, a last-support on the jack-frame, and a toe-last carried by the extension of the jack-frame, substantially as described.

23. In a sole-leveling machine, the combination with a swinging frame, and a sole-shaping roll, of a jack-frame pivoted at its heel to the swinging frame and provided with an extension at its other end, track-rolls carried by the swinging frame below the jack-frame extension, a shifting plate movable with the jack-frame extension and adapted to said track-rolls, and a toe-last on said extension of the jack-frame, substantially as described.

24. In a sole-leveling machine, a jack-frame provided with a perforated toe-support extension, a toe-supporting base shiftable on said extension for movement back and forth thereon, and a toe-support provided with a stem having threaded connection with the toe-supporting base and also fitted in one of the perforations of the toe-support extension, substantially as described.

25. In a sole-leveling machine, a jack-frame provided with a toe-support extension, a toe-supporting base shiftable on said extension, a toe-support having a threaded connection with said base for raising or lowering said toe-support with relation to the extension, and means for locking the toe-support in a fixed position on the toe-supporting base, substantially as described.

26. In a sole-leveling machine, the combination with a jack-frame provided with a perforated toe-support extension, a toe-supporting base shiftably fitted to said extension, a toe-support having a stem which is adjustably connected to said supporting-base and is fitted to the perforated extension, and a locking connection between the toe-support and the toe-supporting base, substantially as described.

27. In a sole-leveling machine, a jack-frame provided with a tubular jack-standard, an internally-threaded collar removably seated in said jack-standard, a jack-supporting stem having an adjustable threaded connection with said collar and removable therewith from the jack-standard, and means for locking said jack-supporting stem in the jack-standard, substantially as described.

28. In a sole-leveling machine, a jack-frame provided with a jack-standard having a bearing at its upper end, a flanged collar sleeved in the bearing for removal readily therefrom, a jack-stem threaded in said collar for adjustment therein and removal therewith from the jack-standard, and a spring-latch arranged to engage with said jack-supporting stem.

29. In a sole-leveling machine, the combination with a vibratory frame, of a drive-shaft geared to said frame and provided with a friction-wheel, oppositely-rotating friction-wheels disposed in operative relation to the friction-wheel on said drive-shaft, and means whereby said drive-shaft may be shifted for its friction-wheel to engage with either of the other friction-wheels, and without disturbing the gear connection between the drive-shaft and the vibratory frame, substantially as described.

30. In a sole-leveling machine, the combination with a vibratory frame, and oppositely-rotating friction-disks, of a tubular shaft sustained by eccentrics in shiftable relation to said friction-disks, and a drive-shaft mounted in the tubular shaft for adjustment therewith and having gear connection with the vibratory frame and provided with a friction-wheel disposed in operative relation to said oppositely-rotating friction-disks, substantially as described.

31. In a sole-leveling machine, the combination with a vibratory frame and oppositely-rotating friction-disks, of a tubular shaft shiftably supported with relation to said friction-disks, a drive-shaft geared to the vibratory frame and mounted in the tubular shaft for shifting adjustment therewith, and provided with a friction-wheel adapted to engage with either of said friction-disks, and means operated by the movement of the vibratory frame to change the position of the tubular shaft, substantially as described.

32. In a sole-leveling machine, the combination with a vibratory frame, and oppositely-rotating friction-disks, of a tubular shaft eccentrically mounted with relation to the friction-disks and provided with an extended arm, a drive-shaft geared to the vibratory frame and having a friction-wheel adapted to either of the friction-disks, and a rod actuated by the vibratory frame and provided with stops adapted to automatically change the position of the tubular shaft, substantially as described.

33. In a sole-leveling machine, the combination with a vibratory frame, and oppositely-rotating friction-disks, of an eccentrically-mounted tubular shaft having an upstanding lug, a hand-lever linked to said lug, a shifting rod connected to the vibratory frame and slidably fitted to said upstanding lug, stops clamped to the shifting rod on opposite sides of said lug, and a drive-shaft geared to the vibratory frame and mounted in the tubular shaft and having a friction-wheel adapted to engage either of said friction-disks, substantially as described.

In witness whereof I have hereunto set my hand in the presence of two witnesses.

ELOUILD DUPLESSIS.

Witnesses:
 WILLIAM B. ROBERTS,
 B. O. BÉLAND.